United States Patent
Ohshita

(10) Patent No.: US 7,626,570 B2
(45) Date of Patent: Dec. 1, 2009

(54) INPUT DEVICE

(75) Inventor: Kazuhito Ohshita, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 605 days.

(21) Appl. No.: 11/340,018

(22) Filed: Jan. 25, 2006

(65) Prior Publication Data

US 2006/0170711 A1 Aug. 3, 2006

(30) Foreign Application Priority Data

Feb. 3, 2005 (JP) ............................. 2005-027233

(51) Int. Cl.
G09G 5/00 (2006.01)
(52) U.S. Cl. ..................... 345/156; 715/829; 715/830
(58) Field of Classification Search ................. 345/156, 345/157, 163, 173, 184, 701, 747; 715/776, 715/808, 810–845
See application file for complete search history.

(56) References Cited

U.S. PATENT DOCUMENTS

| | | | | |
|---|---|---|---|---|
| 5,333,255 | A * | 7/1994 | Damouth | 715/776 |
| 5,696,919 | A * | 12/1997 | Masuno et al. | 715/841 |
| 6,128,006 | A * | 10/2000 | Rosenberg et al. | 345/163 |
| 6,204,837 | B1 * | 3/2001 | Smith | 345/157 |
| 6,483,500 | B1 * | 11/2002 | Choi et al. | 345/184 |
| 6,865,718 | B2 * | 3/2005 | Levi Montalcini | 715/786 |
| 7,042,445 | B2 * | 5/2006 | Hara et al. | 345/184 |
| 7,088,344 | B2 * | 8/2006 | Maezawa et al. | 345/173 |
| 2002/0030667 | A1 * | 3/2002 | Hinckley et al. | 345/173 |
| 2002/0054013 | A1 * | 5/2002 | Graham | 345/156 |
| 2002/0054060 | A1 * | 5/2002 | Schena | 345/701 |
| 2002/0060663 | A1 * | 5/2002 | Wang | 345/156 |
| 2003/0076306 | A1 * | 4/2003 | Zadesky et al. | 345/173 |
| 2004/0001042 | A1 * | 1/2004 | Lindhout et al. | 345/156 |
| 2004/0032395 | A1 * | 2/2004 | Goldenberg et al. | 345/156 |
| 2004/0075676 | A1 * | 4/2004 | Rosenberg et al. | 345/701 |
| 2004/0207658 | A1 * | 10/2004 | Awada et al. | 345/747 |
| 2004/0233052 | A1 * | 11/2004 | Uchigaki et al. | 340/525 |
| 2006/0001657 | A1 * | 1/2006 | Monney et al. | 345/184 |

FOREIGN PATENT DOCUMENTS

JP 2001-242974 9/2001

* cited by examiner

Primary Examiner—Amare Mengistu
Assistant Examiner—Premal Patel
(74) Attorney, Agent, or Firm—Brinks Hofer Gilson & Lione

(57) ABSTRACT

An input device allowing an operator to select any one of selection items of a pop-up menu with an easy operation is provided. The input device includes two kinds of operation units configured to output a coordinate translation signal in at least one direction and a control unit configured to control display information on a display screen on the basis of the coordinate translation signal output from operation unit. When scrollable display information is displayed and the pop-up menu is not displayed on the display screen, the control unit scrolls the display information on the basis of the coordinate-translation signal, and, when the scrollable display information and the pop-up menu are both displayed on the display screen, the control unit controls sequentially highlighting of a plurality of selection items of the pop-up menu on the basis of the coordinate-translation signal.

7 Claims, 3 Drawing Sheets

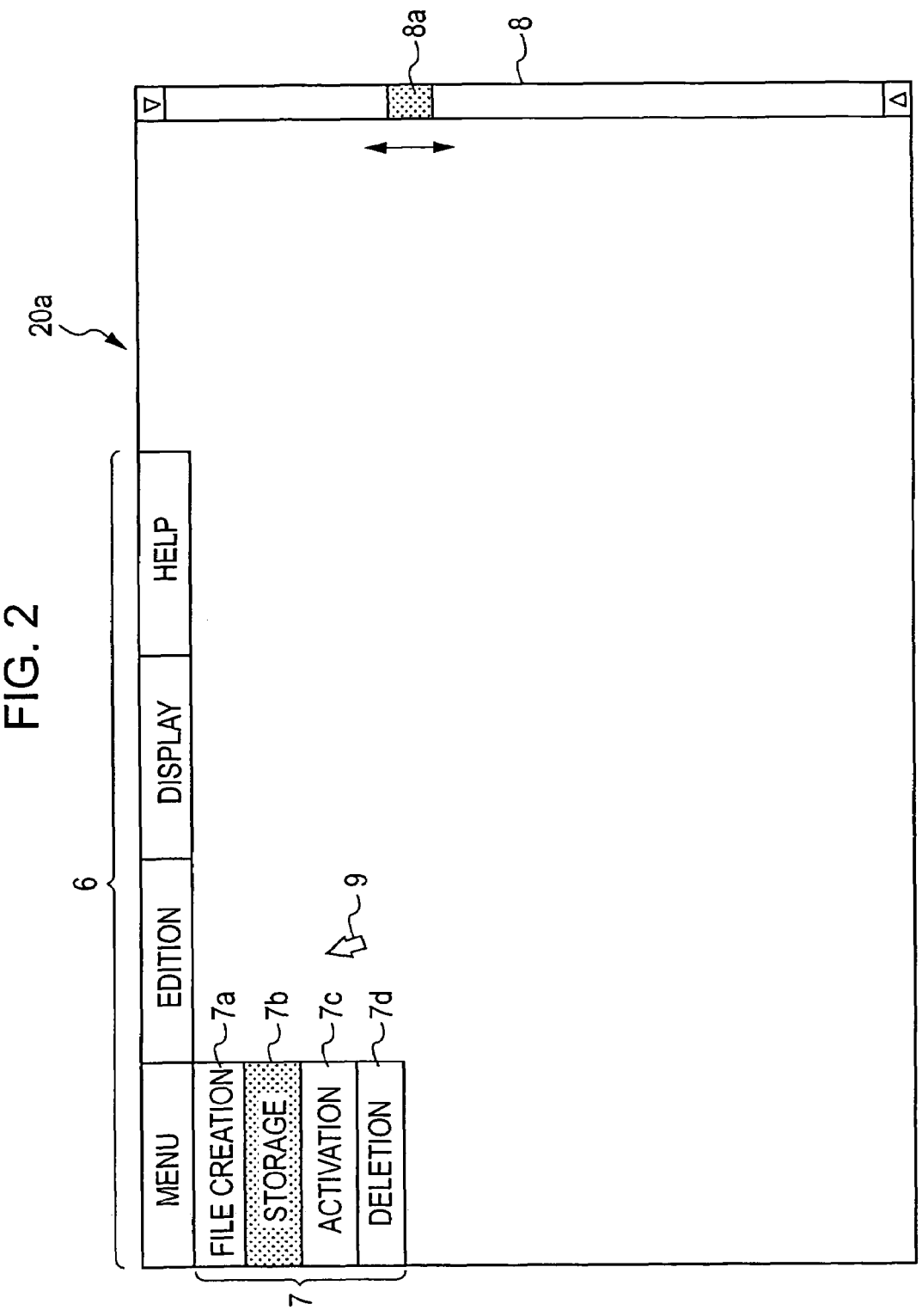

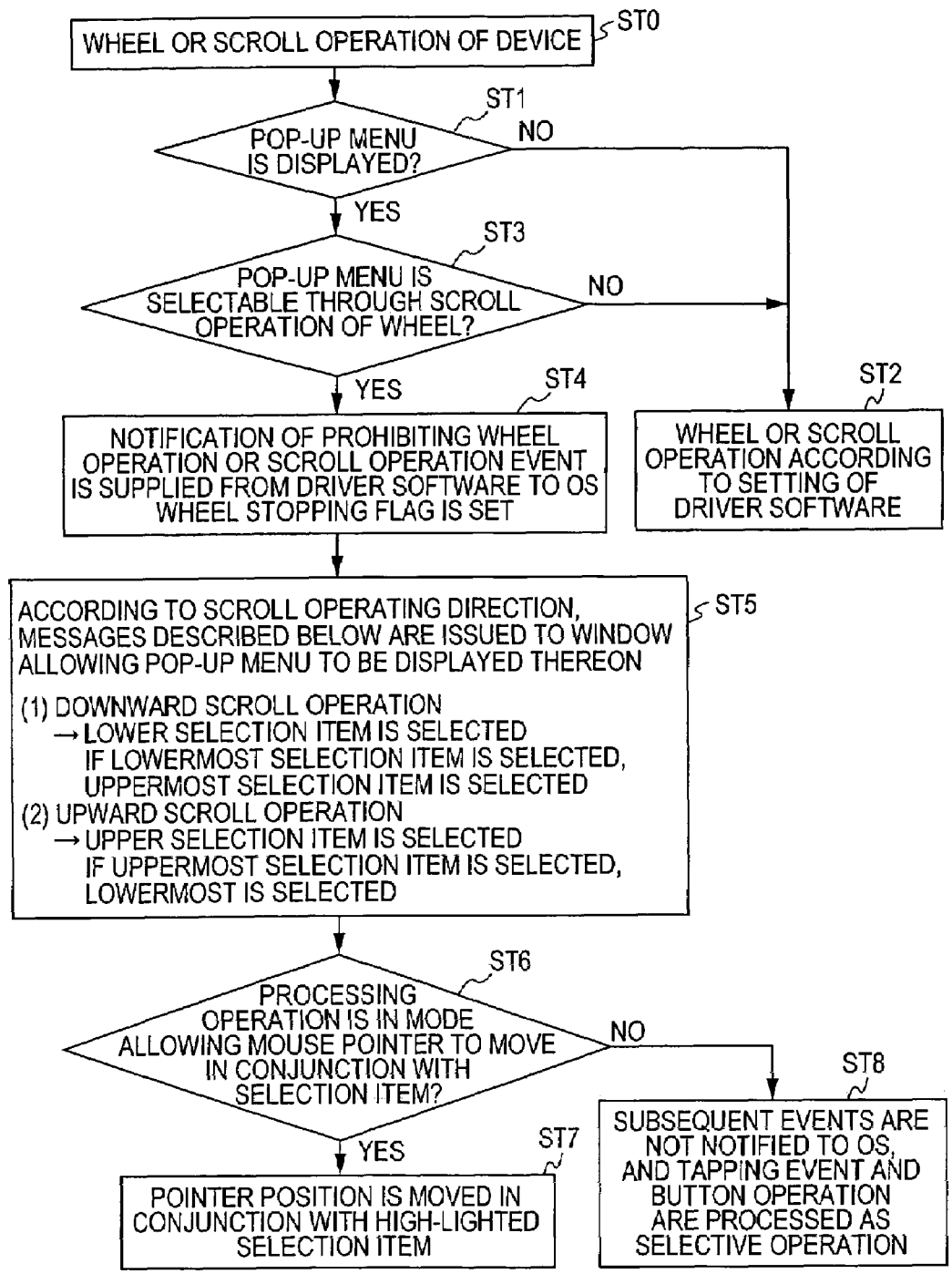

INPUT DEVICE

BACKGROUND OF THE INVENTION

1. Field of the Invention

The present invention relates to an input device adapted for controlling a display state of a display screen of a computer main body, and more particularly, it relates to an input device allowing an operator to select any one of a plurality of selection items of a pop-up menu displayed on a display screen with an easy operation.

2. Description of the Related Art

In order to select any one of a plurality of selection items of a pop-up menus displayed on a screen of a computer main body, in a state of displaying the respective selection items of the pop-up menu, a desired selection item is highlighted, and the highlighted item is selected by actuating a key switch or the like.

Hitherto, in order to select any one of selection items of a pop-up menu, moving a mouse in one direction so as to move a pointer onto a desired selection item is needed. Also, with use of a flat operation device called an input pad, moving a finger on the input pad so as to move a pointer located on a display screen onto a desired selection item is needed.

A technique of moving a pointer on a screen of a computer main body with an input device is disclosed in Japanese Unexamined Patent Application Publication 2001-242974.

In a state of displaying scrollable display information such as a character string along with a pop-up menu, through operation of input means called a wheel, the character string and the like can be scrolled. However, even when the wheel is operated in a state of operating the respective selection items of the pop-up menu, only the character string and the like are scrolled, and any one of the selection items of the pop-up menu is not selected and highlighted.

Likewise, with use of the input pad, in a state in which a pointer is not located on any one of the respective selection items, when a finger is moved on the input pad in one direction, the character string and the like can be scrolled. However, in this case too, even when the finger is moved, any one of the respective selection items of the pop-up menu cannot be highlighted.

SUMMARY OF THE INVENTION

In view of the above-described problems, it is an object of the present invention to provide an input device capable of selecting any one of selection items of a pop-up menu through the same operation as a known scrolling operation.

An input device according to one aspect of the present invention includes an operation unit configured to output a coordinate-translation signal in at least one direction through operation; and a control unit configured to control a display state of display information on a display screen on the basis of the coordinate-translation signal output from the operation unit. On the basis of the coordinate-translation signal, the control unit controls scrolling of the display information and highlighting of a plurality of selection items of the pop-up menu, respectively, when a pop-up menu is not displayed on the display screen and when scrollable display information and the pop-up menu are displayed on the display screen.

For example, the operation unit includes an output section configured to output a two-dimensional coordinate-translation signal or a one-dimensional coordinate-translation signal, and the control unit performs a controlling operation on the basis of the corresponding coordinate-translation signal.

In this case, the operation unit is a mouse, and, by operating a wheel placed on the mouse, the coordinate-translation signal is generated.

Also, in the input device according to the present invention, the mouse includes an operation-instructing section, and, on the basis of a two-dimensional coordinate-translation signal, the control unit moves a pointer onto a menu, designed to move on the display screen, and, upon operation of the operation-instructing section, displays the pop-up menu accompanying the menu pointed by the pointer.

Alternatively, the operation unit is a flat input device configured to output a two-dimensional coordinate-translation signal, and the control unit serves for moving a pointer on the display screen on the basis of the two-dimensional coordinate-translation signal. When the pop-up menu is displayed and the pointer is not located on the pop-up menu, the control unit controls sequentially highlighting of a plurality of selection items of the pop-up menu on the basis of one-dimensional translation signal component of the two-dimensional coordinate-translation signal.

In this case, when the pop-up menu is not displayed, the control unit controls scrolling of the display information on the basis of one-dimensional translation signal component of the two-dimensional coordinate-translation signal.

With the input device according to the present invention, display information on the display screen can be scrolled through operation of, e.g., a wheel of a mouse. With this arrangement, when a pop-up menu is displayed on the display screen, selection items of the pop-up menu can be sequentially highlighted through the operation of the wheel.

With example use of the flat input device, when the pop-up menu is not displayed on the display screen, by sliding a finger on the flat input device in one direction, display information can be scrolled. Also, when the pop-up menu is displayed, even when a pointer is not located on the pop-up menu, by sliding a finger or the like on the flat input device in one direction, selection items of the pop-up menu can be sequentially highlighted.

BRIEF DESCRIPTION OF THE DRAWINGS

FIG. 2 illustrates an exemplary display format of image data; and

FIG. 3 is a flowchart of an operation of the input device shown in FIG. 1 upon selecting an item of the image data shown in FIG. 2.

DESCRIPTION OF THE PREFERRED EMBODIMENTS

Figure 1:
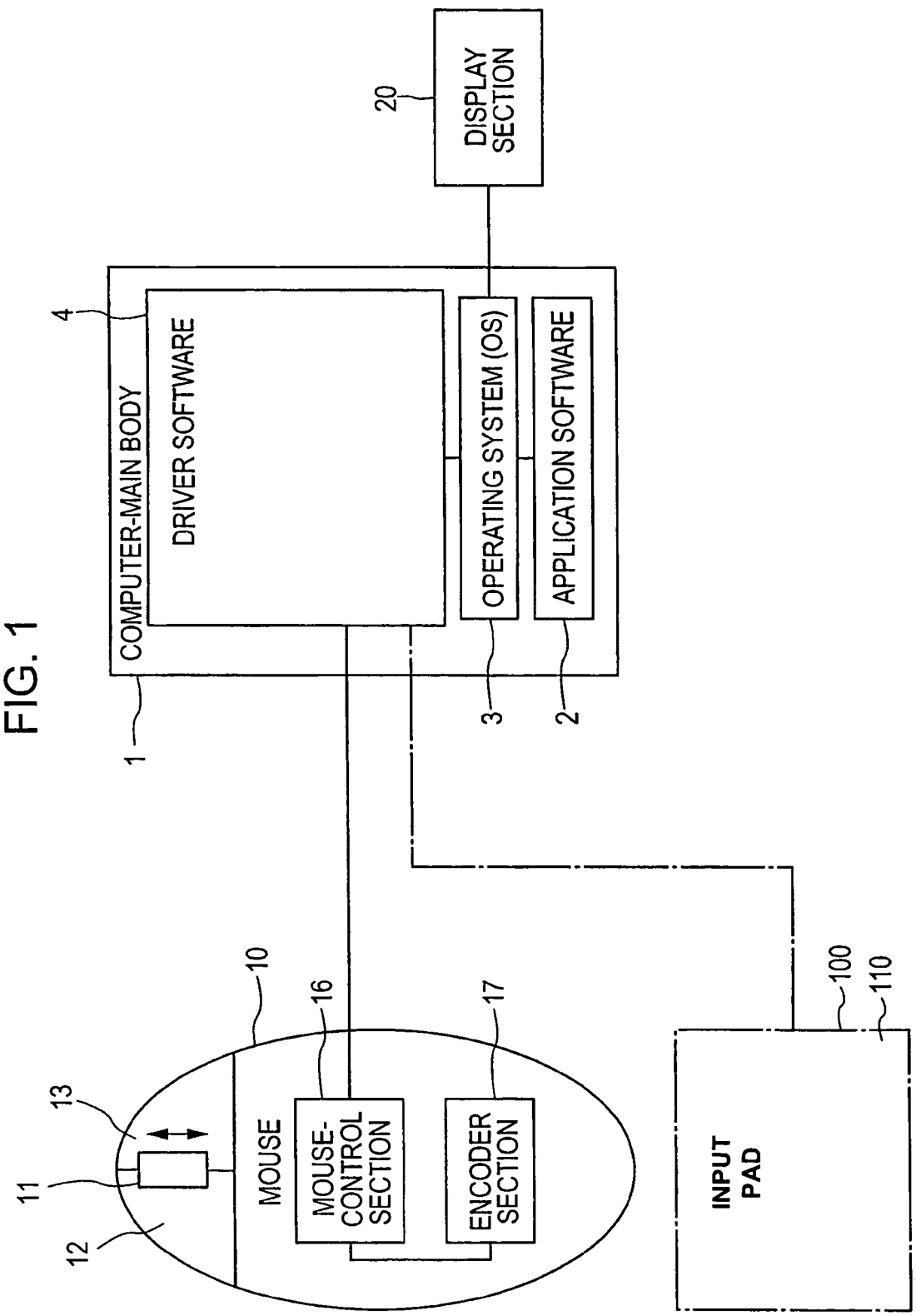
FIG. 1 is a system block diagram illustrating an input device according to an embodiment of the present invention, in addition to illustrating a computer main body and a display unit, both controlled by the input device.

FIG. 1 is a system block diagram illustrating an input device according to an embodiment of present invention, in addition to illustrating a computer main body and a display section, both controlled by the input device.

A computer main body 1 has application software 2, an operating system 3, and driver software 4 serving as a control unit of the input device, stored therein.

The computer main body 1 has a mouse 10 serving as an operation unit, connected thereto. Alternatively, as indicated by a dotted-chain line in FIG. 1, an input pad 100 serving as a flat operation device can be used as the operation unit.

In response to a program operation of the application software 2, the operating system 3 controls displaying of a predetermined image on a display screen 20a (see FIG. 2) of a display section 20. An operation signal from the mouse 10 or the input pad 100 is supplied to the driver software 4 so as to undergo a control processing. The driver software 4 generates a control signal responsive to the operation signal from the operation unit. When the control signal is supplied to the operating system 3, various kinds of information displayed on the display screen 20a are controlled on the basis of the operation signal.

For example, along with the various kinds of information, a pointer 9 (see FIG. 2) is displayed on the display screen 20a, and, on the basis of the control signal supplied from the driver software 4 to the operating system 3, the operating system 3 performs display control so as to move the pointer 9 on the display screen 20a. When scrollable display information such as a character string is displayed on the display screen 20a, display control adapted for scrolling the display information on the basis of the control signal supplied from the driver software 4 to the operating system 3 is also possible.

The mouse 10 includes a two-dimensional encoder configured to generate a two-dimensional coordinate-translation signal and a one-dimensional encoder configured to generate a one-dimensional coordinate-translation signal. FIG. 1 illustrates an encoder section 17 as a collective component of the two-dimensional encoder and the one-dimensional encoder. The two-dimensional encoder is of an optical type or a mechanical type as a combination of two rotary encoders, and, by moving the mouse 10 along a table or the like, the two-dimensional coordinate-translation signal are generated. The one-dimensional encoder is, e.g. a rotary encoder configured to generate moving signals in mutually opposite directions. By rotating a wheel 11 placed on the mouse 10 in arrow directions indicated in the figure, the one-dimensional encoder is operated.

The mouse 10 includes two switches, which are operated by an L-button 12 and an R-button 13, both constituting an operation-instruction section according to the present invention.

Signals obtained from the two-dimensional encoder and the one-dimensional encoder are supplied from the encoder section 17 to a mouse-control section 16. Operation signals of the two switches are also supplied to the mouse-control section 16. The mouse-control section 16 and the driver software 4 are connected to each other having a predetermined interface interposed therebetween, via a PS/2 port or a USB port. The signals obtained from the encoders and the switches are converted into signal strings in a predetermined format in the mouse-control section 16 and supplied to the driver software 4.

The input pad 100 is of a capacitive type or the like and has electrodes arranged below an operation surface 110 thereof in a matrix pattern. When a conductor such as a human finger comes into contact with the operation surface 110, its contacting state can be detected due to a change in capacitance of the pad. Also, when the finger is moved along the operation surface 110, the moving position of the finger or the like can be detected due to change of the position at which the capacitance of the pad changes. The input pad 100 includes a pad control section similar to the mouse-control section 16. The pad control section generates a two-dimensional coordinate-translation signal in accordance with movement of the finger on the operation surface 110 and a dummy switch in accordance with a tapping action of the finger (an action of the finger, attaching to the operation surface 110 in a short period of time and detaching from the same). These signals are supplied from the pad control section to the driver software 4.

Usually, when the computer main body 1 has the mouse 10 connected thereto, the driver software 4 accepts only a control signal from the mouse-control section 16 and neglects a control signal from the pad control section. When the computer main body 1 recognizes that the mouse 10 is not connected, the driver software 4 accepts the control signal from the pad control section.

FIG. 2 illustrates an example image, e.g., a document creation screen, displayed on the display screen 20a. The display screen 20a has a plurality of menus 6 and a scroll bar 8 displayed on the upper left corner and right end thereof, respectively. The scroll bar 8 has a slider 8a horizontally movable displayed thereon in one-dimensional manner. Also, on an area other than the plurality of menus 6 and the scroll bar 8, the display screen 20a has character strings displayed thereon, serving as vertically scrollable display information. When vertical movement of the slider 8a is displayed, in conjunction with this display, the operating system 3 controls display of vertically scrolling of the character strings.

Although the display screen 20a has a horizontally extending scroll bar displayed along the lower end thereof, and control of horizontally scrolling the character strings is possible by horizontally moving the slider of the scroll bar, the scroll bar extending horizontally is not displayed in FIG. 2.

When any one of the plurality of menus 6 is selected, a pop-up menu 7 accompanying the selected menus as a sub-menu of the selected item is displayed. FIG. 2 illustrates a state in which MENU of the menus 6 is selected, and the pop-up menu 7 including selection items 7a, 7b, 7c, and 7d, respectively indicating FILE CREATION, STORAGE, ACTIVATION, and DELETION is displayed. Of the selection items 7a, 7b, 7c, and 7d of the pop-up menu 7, the selection item 7b: STORAGE 7b is selected and high-lighted in FIG. 2. When the L-button 12 of the mouse 10 is operated in a state of high-lighting any one of the selection items, the operating system 3 performs a controlling operation of STORAGE corresponding to the selected selection item 7b.

If an image of the display screen 20a does not represent a document creation screen, the pop-up menu 7 displays, e.g., a pop-up menu other than a pull-down menu.

Referring now to a flowchart illustrated in FIG. 3, display control of operating system 3 with use of the mouse 10 will be described. Step ST0 shows a control processing of operating the wheel 11 of the mouse 10 so as to supply the one-dimensional coordinate-translation signal from the one-dimensional encoder to the driver software 4 via the mouse-control section 16.

In a state in which any one of the menus 6 is not selected and the pop-up menu 7 is not displayed on the image shown in FIG. 2 (step ST1), when the one-dimensional coordinate-translation signal from the one-dimensional encoder is supplied to the driver software 4, a scroll control signal is supplied from the driver software 4 to the operating system 3. Accordingly, display control is performed on the display screen 20a so as to move the slider 8a of the scroll bar 8 upwards or downwards according to a rotation-operating direction of the wheel 11 and to scroll the character strings displayed on the display screen 20a upwards or downwards along with the movement of the slider 8a (step ST2).

When no character strings are displayed on the display screen 20a, in the foregoing step ST2, display control along with the rotating operation of the wheel 11, other than controlling the scrolling operation, is performed. The display control represents, for example, rotation display control of a display image, or movement or rotation display of a character in a game operation.

Then, determination is made in step ST3 whether a mode allowing any one of the selection items 7a, 7b, 7c, and 7d of the pop-up menu 7 to be selected through operation of the wheel 11 is set. In other words, a mode of the driver software 4 can be previously set on the basis of setting any one of the menus on a control panel. If the mode of the driver software is not previously set so as to perform a selecting operation of the pop-up menu 7 through operation of the wheel 11, even when a determination in step ST1 is such that the pop-up menu 7 is displayed, the process proceeds to step ST2, and a controlling operation for scrolling the character strings through operation of the wheel 11 is performed. Alternatively, the display control along with the rotating operation of the wheel 11, other than controlling the scrolling operation, is performed as described above.

If the determination in step ST1 is such that the pop-up menu 7 is displayed, and, if a determination in step ST3 is such that the driver software 4 is set in a mode allowing the pop-up menu 7 to be selectable through operation of the wheel 11, the process proceeds to step ST4. The operation for displaying the pop-up menu 7 is performed, for example, by pressing the L-button 12 in a state in which the pointer 9 moved onto any one of the menus 6 on the basis of a two-dimensional coordinate-translation signal supplied from the two-dimensional encoder of the mouse 10 to the driver software 4. With this operation, the pop-up menu 7 accompanying any of one of the menus 6 pointed by the pointer 9 is displayed.

In step ST4, notification of prohibiting a scrolling operation for scrolling character strings is supplied from the driver software 4 to the operating system 3, and a flag adapted for prohibiting the scrolling operation is set in the operating system 3. When no character strings are displayed on the display screen 20a as described above, a flag adapted for prohibiting display control associated with the rotating operation of the wheel 11, other than controlling the scrolling operation, is also set in the operating system 3.

Then, the process proceeds to step ST5. In step ST5, when the one-dimensional coordinate-translation signal from the one-dimensional encoder is supplied to the driver software 4, a control signal for selection of the pop-up menu 7 is supplied from the driver software 4 to the operating system 3. The operating system 3 controls selecting and highlighting any one of the selection items 7a, 7b, 7c, and 7d of the pop-up menu 7 according to a direction of the rotating operation of the wheel 11.

When the wheel 11 is rotated in a direction toward an operator by way of example, the selection items 7a, 7b, 7c, and 7d of the pop-up menu 7 are highlighted in that order. After highlighting the lowermost selection item 7d, the displaying operation returns to the uppermost selection item 7a so as to highlight it again. When the wheel 11 is rotated in the other direction away from the operator, the selection item 7d, 7c, 7b, and 7a of the pop-up menu 7 are highlighted in that order. After highlighting the uppermost selection item 7a, the displaying operation returns to the lowermost selection item 7d so as to highlight it again.

An order of highlighting the selection items 7a, 7b, 7c, and 7d of the pop-up menu 7 is arbitrarily set through control of the driver software 4. Also, whether the displaying operation returns to the uppermost selection item 7a so as to highlight it again after highlighting the lowermost selection item 7d or whether the displaying operation returns to the lowermost selection item 7d so to highlight it again after highlighting the uppermost selection item 7a is controllable with the driver software.

When the rotating operation of the wheel 11 is stopped in a state of highlighting any one of selection items, a processing operation of the driver software 4 is moved to step ST6.

While the processing mode of the driver software 4 can be previously set on the basis of setting any of the menus of the control panel as described above, on this occasion, setting a mode allowing the pointer 9 to automatically move to a highlighted selection item is possible. When this mode is set, the process proceeds to step ST7, the wheel 11 stops rotation, and, at the time when the one-dimensional coordinate-translation signal from the one-dimensional encoder cannot be supplied to the driver software 4, a control signal designed to move a display position of the pointer 9 to the highlighted selection item (7b in the example shown in FIG. 2) is supplied from the driver software 4 to the operating system 3. With this arrangement, display control is performed so as to quickly move the pointer 9 displayed on the display screen 20a onto the highlighted selection item.

Upon operating the L-button 12 or the R-button 13, an instruction designed to activate a processing operation of the driver software, corresponding to the highlighted selection item is supplied from the driver software 4 to the operating system 3, and the processing operation corresponding to the selection item (7b: STORAGE in FIG. 2) is executed.

If a determination made in step ST6 is such that the mode allowing the pointer 9 to move to the high-lighted selection item is not set, the displayed position of the pointer 9 is not moved, and, at the moment of operating the L-button 12 or the R-button 13, a selective operation is performed. For example, an instruction designed for activating the processing operation of the driver software, corresponding to the highlighted selection item is supplied from the driver software 4 to the operating system 3, and the processing operation is executed (step ST8).

A processing operation of the driver software with use of the input pad 100 will be described. Upon sliding a finger on the operation surface 110 of the input pad 100, a two-dimensional coordinate-translation signal corresponding to the slid position of the finger is supplied from the pad control section to the driver software 4. In response to the coordinate translation signal, a control signal is supplied from the driver software 4 to the operating system 3 so as to control moving of the display position of the pointer 9.

At the time of when the pointer 9 is moved onto any one of the menus 6 with this operation, by tapping the operation surface 110, the pop-up menu 7 accompanying the menu is displayed. At this moment, when the finger is moved along the operation surface 110 towards the operator without another action, the selection items 7a, 7b, 7c, and 7d of the pop-up menu are selected and highlighted in that order. Thus, in a state in which any one of the selection items is highlighted and the pointer 9 is located on the highlighted selection item, tapping the operation surface 110 with the finger allows the driver software 4 to execute an operation corresponding to the selected item (e.g., a STORAGE operation).

In the meantime, when the pop-up menu 7 is displayed, in a state in which the pointer 9 is not moved onto the pop-up menu 7 and located, for example, at a display position of character strings, sliding the finger towards the operator along the operation surface 110 allows the selection items 7a, 7b, 7c, and 7d of the pop-up menu 7 to be highlighted in that order, and sliding the finger in a direction away from the operator allows the selection items 7d, 7c, 7b, and 7a of the pop-up menu to be highlighted in that order.

Thus, in a state of highlighting any one of the selection items, tapping the operation surface 110 allows the driver software 4 to execute a processing operation corresponding to the high-lighted selection item. On this occasion, as illustrated in step ST7 shown in FIG. 3, at the time when any one of the selection items is highlighted, the driver software may perform a processing operation for automatically moving the pointer 9 onto the highlighted selection item.

If, however, the pop-up menu 7 is not displayed on the display screen 20a, sliding the finger on the operation surface 110 allows the driver software 4 to execute the normal processing operation. In other words, the driver software 4 performs a processing operation for moving the display position of the pointer 9 in response to the moving position of the finger on the operation surface 110.

Alternatively, on a predetermined area of the operation surface 110, when the finger is slid towards the operator or in a direction far away from the operator in one-dimensional manner, the operation software 3 performs a displaying operation for scrolling the characters string upwards or downwards. Alternatively, the character strings may be scrolled through one-directional sliding operation of the finger only when the pointer 9 is located on the slider 8a. Alternatively, the scroll display may be performed only when the sliding operation is performed after a finger is placed on the operation surface 110 and the operation surface 110 is tapped with the finger.

That is, with use of the input pad 100, when the pop-up menu 7 is displayed, in response to a sliding operation of the finger on the operation surface 110, the selection items of the pop-up menu 7 are sequentially highlighted. Also, when the pop-up menu 7 is not displayed, according to the sliding operation or the tapping operation of the finger on the operation surface 110, display control other than controlling of the highlight display is performed, and, on this occasion, character strings can be scrolled.

What is claimed is:

1. An input device comprising: operation means for outputting a coordinate-translation signal in at least one direction through operation; and control means for controlling a display state of display information on a display screen on the basis of the coordinate-translation signal output from the operation means,
   wherein, on the basis of the display state, the control means determines whether a mode allowing any one of a plurality of selection items of a pop-up menu to be selected is set,
   wherein when the mode is set, a notification of prohibiting a scrolling operation from scrolling character strings is supplied to the control means, and a flag adapted for prohibiting the scrolling operation is set in the control means,
   wherein, on the basis of the coordinate-translation signal, the control means controls scrolling of the display information and highlighting of the plurality of selection items of the pop-up menu, respectively, when the pop-up menu is not displayed on the display screen and when scrollable display information and the pop-up menu are displayed on the display screen, and
   wherein when scrollable display information and the pop-up menu are displayed on the display screen, the plurality of selection items are highlighted sequentially as a loop with the uppermost selection item following the lowermost selection item in a downward scroll operation and the lowermost selection item following the uppermost selection item in an upward scroll operation.

2. The input device according to claim 1, wherein the operation means includes an output section configured to output a two-dimensional coordinate-translation signal or a one-dimensional coordinate-translation signal, and the control means performs a controlling operation on the basis of the corresponding coordinate-translation signal.

3. The input device according to claim 2, wherein the operation means is a mouse, and, by operating a wheel placed on the mouse, the coordinate-translation signal is generated.

4. The input device according to claim 3, wherein the mouse includes an operation-instructing section, and, wherein, on the basis of the two-dimensional coordinate-translation signal, the control means moves a pointer designed to move on the display screen onto a menu, and, upon operation of the operation-instructing section, displays the pop-up menu accompanying the menu pointed by the pointer.

5. The input device according to claim 1, wherein the operation means is a flat input device configured to output a two-dimensional coordinate-translation signal, and the control means serves for moving a pointer on the display screen on the basis of the two-dimensional coordinate-translation signal, and, wherein, when the pop-up menu is displayed and the pointer is not located on the pop-up menu, the control means controls sequentially highlighting of a plurality of selection items of the pop-up menu on the basis of a one-dimensional translation signal component of the two-dimensional coordinate-translation signal.

6. The input device according to claim 5, wherein, when the pop-up menu is not displayed, the control means controls scrolling of the display information on the basis of the one-dimensional translation signal component of the two-dimensional coordinate-translation signal.

7. The input device according to claim 1, wherein, when any one of the selection items is highlighted, the control means performs an operation of automatically moving a pointer onto the highlighted selection item.

* * * * *

UNITED STATES PATENT AND TRADEMARK OFFICE
CERTIFICATE OF CORRECTION

PATENT NO. : 7,626,570 B2 Page 1 of 1
APPLICATION NO. : 11/340018
DATED : December 1, 2009
INVENTOR(S) : Kazuhito Ohshita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 915 days.

Signed and Sealed this

Second Day of November, 2010

David J. Kappos
*Director of the United States Patent and Trademark Office*